Nov. 20, 1951
G. B. WILKEN
2,575,435
SELF-SETTING RODENT TRAP
Filed Nov. 10, 1949
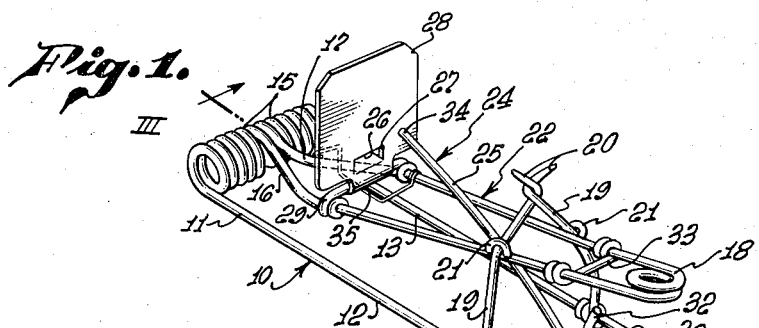
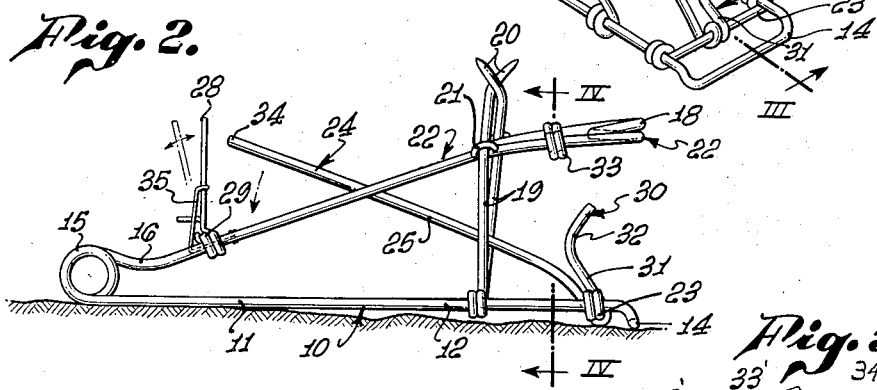
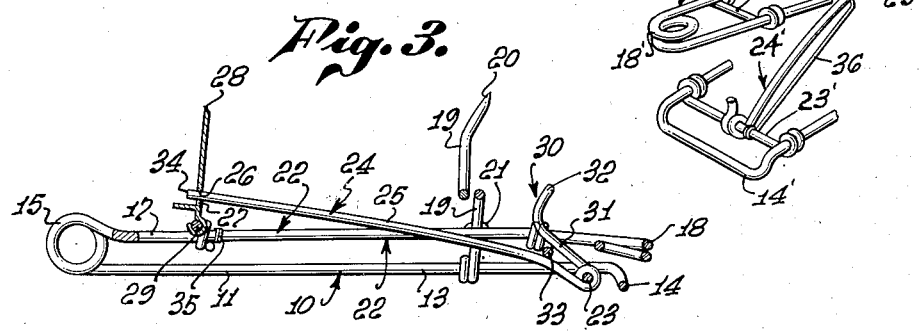
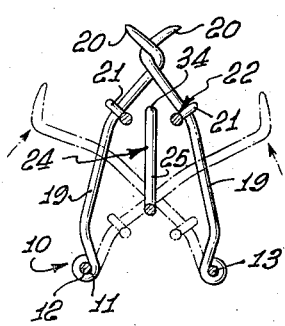
GEORGE B. WILKEN,
INVENTOR.
BY
ATTORNEY.

Patented Nov. 20, 1951

2,575,435

UNITED STATES PATENT OFFICE 2,575,435

SELF-SETTING RODENT TRAP

George B. Wilken, Escondido, Calif.

Application November 10, 1949, Serial No. 126,505

6 Claims. (Cl. 43—91)

This invention relates to an improved rodent trap embodying an arrangement for automatically and easily setting the trap without danger to the fingers or hands of the person setting the trap.

Prior proposed rodent traps for moles, gophers, etc., include strong springs which actuate, by various means, and opposed members or arms having pointed ends adapted to pierce and impale a rodent. It is difficult and awkward to set such a trap because of the necessity of guidably moving (while working against a strong spring resistance) a latching lever or trigger arm into engagement with a trip plate. Both hands and several fingers are usually required to accomplish the trap setting operation. Since the trap is relatively small and hard to hold while working against the spring resistance, one hand usually works in close proximity to the piercing arms of the trap. Slipping of either hand may cause a partially set trap to suddenly close with resultant serious injury to one or both of the hands.

The primary object of this invention is to design and provide a simple and efficient arrangement for automatically setting a rodent trap by the operation of only a single hand and without placement of the hand near the piercing arms.

Another object of this invention is to design and provide an improved self-setting gopher trap wherein a latch lever may be automatically moved into positive engagement with a trip plate for setting of the trap.

A further object of this invention is to design and provide an automatic self-setting gopher trap wherein the latching lever is cooperatively associated with movement of the spring-biased trap-actuating member so as to control movement of the lever and bring it into proper trigger plate engaging position.

Other objects and advantages of this invention will be readily apparent from the following description of the drawings.

In the drawings:

Fig. 1 is a perspective view of a trap embodying this invention.

Fig. 2 is a side view of the trap shown in Fig. 1.

Fig. 3 is a sectional view taken in a vertical, longitudinally extending plane indicated by the line III—III of Fig. 1.

Fig. 4 is a sectional view taken in a transverse, vertical plane indicated by the line IV—IV of Fig. 2.

Fig. 5 is a fragmentary view in perspective illustrating a modification of this invention.

Referring particularly to Fig. 1, the rodent trap generally indicated at 10 includes a trap of well-known form and manufacture, generally identified as a Macabee-type of gopher trap.

The gopher trap 10 includes a base frame 11 comprising a generally U-shaped wire frame having spaced parallel legs 12 and 13 joined at one end by a transverse element 14. At the opposite end of the frame 11 the ends of legs 12 and 13 may be suitably wound inwardly to provide transversely extending and axially aligned helical springs 15. The springs 15 terminate centrally of the base in wire elements 16 and 17 overlying the base frame 10 and normally angularly disposed with respect to the base 11. The base, spring and elements 16 and 17 may be of one piece of suitable wire.

The elements 16 and 17 flare outwardly adjacent springs 15, are bent slightly inwardly intermediate the ends of the trap, and terminate generally above the transverse element 14 on the base frame 11. In the preferred form of my invention, elements 16 and 17 are integrally joined to provide a thumb piece or rest 18 which extends beyond the base, the rest being formed by turning the wire about a vertical axis and having sufficient diameter for providing an adequate supporting surface for a thumb placed thereupon when setting the trap. Elements 16 and 17 and thumb piece or rest 18 thereby form a trap setting and actuating member 22.

Upwardly directed and inwardly bent opposed piercing arms 19 may be turnably mounted on legs 12 and 13, said arms having their upper ends 20 sharply bent outwardly so as to provide opposed piercing points when the arms are in their trap-setting position. The arms 19 are guided to and from their open and closed positions by means of U-shaped guides 21 secured on elements 16 and 17 above the pivotal mounting of arms 19. As the overlying actuating member 22 is pressed downwardly by a thumb placed upon thumb rest 18, piercing arms 19 will be spread apart into open position by the guides 21. When the trap is sprung, elements 16 and 17 are moved upwardly by the action of springs 15, the guides causing the arms 19 to move to closed position.

This invention lies in an automatic self-setting arrangement for moving and holding the piercing arms into open, trap-set position. The invention is illustrated by way of example in Fig. 1, and comprises a cross-member 23 extending between the legs 12 and 13 of the base adjacent the transverse element 14. Turnably mounted upon said cross-member 23 intermediate its ends is a longitudinally extending latching lever 24 having a main arm 25 extending toward the opposite end of the trap and terminating in a trip plate engaging end 34. When the trap is set, end 34 engages the lower edge of trip plate 28 or an upper edge 26 of a port 27 formed centrally adjacent the lower portion of an upstanding transverse rectangular trip plate 28. Plate 28 may be hinged to a cross-member 29 extending between elements 16 and 17 adjacent the spring end of the trap.

Adjacent cross-member 23, latching lever 24 is also provided with a lever setting end 30 having a return portion 31 overlying and spaced from the adjacent section of the main arm 25 for a short distance, said return portion 31 terminating in an upwardly and rearwardly bent portion 32 lying at approximately right angles to the axis of the main arm 25.

A cross-bar 33 carried on the actuating member 22 virtually above the lever setting end 30 is adapted to engage bent portion 32 when the trap is being set for positioning lever 24 so that end 34 will be positively engaged in the port 27.

Trip plate 28 is spring-biased toward the latching lever 24 by means of a spring member 35 carried by wire element 17 forwardly of plate 28. The spring member 35 may extend transversely inwardly to approximately the center of member 29 and may be bent to pass beneath member 29 and then curved upwardly and outwardly for connection to the margin of plate 28 adjacent wire element 16. The spring member 35 is adjustable to bias plate 28 toward lever 24 so that in trapset position end 34 will project into port 27 a predetermined distance for regulating the responsiveness of the trap to pressure exerted on the trip plate.

When it is desired to set the gopher trap, the trap may be placed in one hand with the fingers encircling base 11, or it may be placed upon a flat surface, with a thumb resting upon the thumb piece or rest 18. As the thumb presses the overlying actuating member 22 downwardly, cross-bar 33 contacts the bent portion 32 of lever setting end 30 of the latching lever and first urges the main arm slightly upwardly above the port 27 in the trigger plate 28. As member 22 is pressed further downwardly, cross-member 33 contacts the adjacent section of the main arm 25 and depresses the trip plate engaging end 34, said end 34 slidably engaging the opposed surface of the trip plate immediately above the port 27. As the cross-member 33 moves between the return portion 31 and the adjacent portion of the main arm 25, the end 34 is brought below the upper edge 26 of the port 27 and snaps into said port because plate 28 is spring-biased in the direction of the latching lever 24. When the thumb is released, the member 22 is urged upwardly by springs 15 and the cross-bar 33 contacts the underside of the return portion 31 for holding end 34 of main arm 25 in positive contact with the upper edge 26 of the port.

The pivotal mounting of latching lever 24 is made in such a manner that main arm 25 is held, during movements, in vertical longitudinal planes passing through port 27 and is thus prevented from lateral movement which would misalign end 34 with port 27. If desired a wire member may be connected between arm 25 and cross arm 23 for guidably holding said lever in alignment.

The trap is sprung by rotating or tilting the trip plate away from the latching lever 24, thus disengaging end 34 of the lever with the port 27 in the trip plate. Normally, in operation, the trip plate is thus tilted by contact of a gopher's head therewith.

The modification illustrated in Fig. 5, differs from the previous modification in that a spring means 36 is provided for upwardly biasing the latching lever 24' and in that the bent lever setting end portion is eliminated. The spring member 36 is connected to cross member 23' adjacent the pivotal connection of lever 24'. The spring member 36 extends along a major portion of the length of main arm 25' and then is suitably connected to arm 25' as by winding a few turns of member 36 therearound. The spring member 36 biases said arm upwardly so that in normal trap open position end 34' of lever 24' is in raised position above the port in the trip plate. The arm 25' is also held in alignment with the trip plate by the spring member 36.

When the trap shown in Fig. 5, is set, (during downward movement of the actuating member 22'), the cross bar 33' contacts main arm 25' adjacent the pivotal connection of lever 24' to cross member 23'. Since arm 25' is normally biased upwardly with end 34' positioned above the port in the trip plate, said contact of arm 25' urges the arm 25' downwardly against spring member 36 until the trip plate engaging end 34' snaps into engagement with an edge of the port in the trip plate which is spring-biased toward the latching lever as in the prior modification.

The positive and automatic setting of such a rodent trap by the use of only one hand is very advantageous and reduces to a minimum the hazards and dangers involved in setting such a trap because the fingers hold the trap on the side opposite that side on which the piercing arms are operable. The thumb rest is also spaced from the piercing arms and is of sufficient area that slipping of a thumb between the piercing arms is extremely unlikely. It is obvious that there is no necessity for using a second hand while setting the trap, either to steady the trap or to guide the latching lever into trap-set position with the trip plate.

It will be apparent to those skilled in the art that other modifications and changes may be made in the exemplary device described above without departing from the spirit of the invention, and all changes and modifications coming within the scope of the appended claims are embraced thereby.

I claim:

1. In a self-setting rodent trap, including a longitudinally extending base, a spring-biased actuating member carried by the base, and a trip plate hingedly connected to the actuating member, the provision of: a thumb piece formed on the free end of the actuating member; a latching lever pivotally mounted on the base beneath said free end, one end of said lever being adapted to extend into engagement with the trip plate to latch the same and releasably hold the plate in said position; spring means associated with the latching lever biasing the latter out of engagement with the trip plate; and means carried by the actuating member for contact with the latching lever adjacent its point of pivotal connection to move the latching lever into latching engagement with the trip plate when said thumb piece is depressed toward the base.

2. A self-setting rodent trap of the character stated in claim 1, wherein the latching lever extends longitudinally of the base, the trip plate includes spring means urging the latter toward the end of the latching lever, piercing arms pivotally carried by the base and a slidable connection between the actuating member and said piercing arms.

3. In a self-setting rodent trap including a base, an overlying longitudinally extending trap-setting and trap-actuating member having one end spring mounted to said base, and piercing arms pivotally connected to the base and slidably connected to the actuating member for movement of said arms in a plane transverse to the actuating member, the provision of: a thumb rest provided at the free end of the actuating member, a cross arm carried by the actuating member in a zone spaced from the thumb rest and between the thumb rest and the slidably connecting piercing arms; a latching lever pivotally mounted on the base beneath said thumb rest and said cross arm for movement in a longitudinal vertical plane, said latching lever including a trip engaging end; an upstanding ported transverse trip plate pivotally mounted on the actuating member adjacent the spring mounted end thereof; spring means lightly biasing the trip plate toward the latching lever; means provided on the latching lever for moving said trip engaging end upwardly, said latching lever being upwardly arched, whereby the cross arm contacts the latching lever to move the trip engaging end thereof into engagement with the port of the trip plate upon downward movement of the actuating arm.

4. A self-setting trap of the character stated in claim 3, wherein the means provided on the latching lever includes spring means for upwardly biasing the latching lever.

5. A self-setting trap of the character stated in claim 3 wherein the means provided on latching lever includes a return portion overlying an adjacent section of the lever in spaced relation and terminating in an upwardly bent portion, said bent portion being in position for slidable engagement by the cross arm as the actuating member is depressed to raise the trip engaging end of the latching lever before said cross arm contacts the latching lever to move the trip engaging end thereof into engagement with the port of the trip plate.

6. A self-setting trap of the character stated in claim 3 wherein the means provided on the latching lever includes a return portion overlying an adjacent section of the lever in spaced relation and terminating in an upwardly bent portion, said cross arm on said actuating member being adapted to slidably engage said upwardly bent portion for raising the trip engaging end of the latching lever above said port as said actuating member is depressed for setting the trap, said cross arm being adapted to be received between the return portion and the adjacent section of the lever for lowering the trip engaging end of the lever into engagement with an edge of said port.

GEORGE B. WILKEN.

REFERENCES CITED

The following references are of record in the file of this patent:

UNITED STATES PATENTS

| Number | Name | Date |
|---|---|---|
| 659,932 | Macabee | Oct. 16, 1900 |
| 1,754,867 | Stoya | Apr. 15, 1930 |